United States Patent [19]

Briley

[11] Patent Number: 5,394,832
[45] Date of Patent: Mar. 7, 1995

[54] EQUINE FEED BIN

[76] Inventor: Lane Briley, P.O. Box 436, Council, Id. 83612

[21] Appl. No.: 172,578

[22] Filed: Dec. 23, 1993

[51] Int. Cl.$^6$ .............................................. A01K 5/00
[52] U.S. Cl. .................... 119/58; 119/51.11; 119/61
[58] Field of Search ............... 119/51.11, 52.1, 58, 119/60, 61

[56] References Cited

U.S. PATENT DOCUMENTS

| | | | |
|---|---|---|---|
| 493,040 | 3/1893 | Morse | 119/58 |
| 3,362,382 | 1/1968 | Frasier | 119/58 |
| 4,029,051 | 6/1977 | McKinney | 119/61 |
| 4,554,888 | 11/1985 | Gross | 119/53 |
| 4,949,675 | 8/1990 | Parks | 119/51.11 |
| 4,976,222 | 12/1990 | Cooke | 119/60 |
| 5,123,379 | 6/1992 | von Taschitzki | 119/53.5 |

FOREIGN PATENT DOCUMENTS

| | | | |
|---|---|---|---|
| 136451 | 7/1952 | Switzerland | 119/52.1 |
| 21486 | 9/1896 | United Kingdom | 119/52.1 |

Primary Examiner—John G. Weiss
Attorney, Agent, or Firm—Frank J. Dykas; Craig M. Korfanta

[57] ABSTRACT

The invention is a feeder for horses comprising an elongate feeder housing with a feeding chamber. Feeder has a rounded front forming an elliptical arc in relation to the back with a feed access opening in the front. The feed access opening accommodates entry of a horse's head into the feeding chamber. The lower edge of the feed access opening is positioned so the bottom of the chamber is a feed holding bin. The top of the feeder has a feed delivery opening close to the back of the housing. The feed delivery opening is rectangular for accepting a hay flake, the feed delivery opening extends into the feeder housing as a feed delivery chute, allowing the hay flake to land in the back of the feed chamber with the upper portion of the flake still in the delivery chute. The feed delivery opening has a removable cover. In any embodiment, the bottom of the feeder can contain a removable plug for cleaning of the feed chamber. In one embodiment of the invention the back of the feeder contains a 90° angle for placement of the feeder in a corner. Any embodiment can have a timer means for regulation of delivery of the hay flake. An additional option for any embodiment is a separate, supplemental feed delivery chute that fits into the feed delivery opening of the feeder. The chute can incorporate the timer means as an alternative or adjunct to the timer being part of the feed delivery opening.

18 Claims, 16 Drawing Sheets

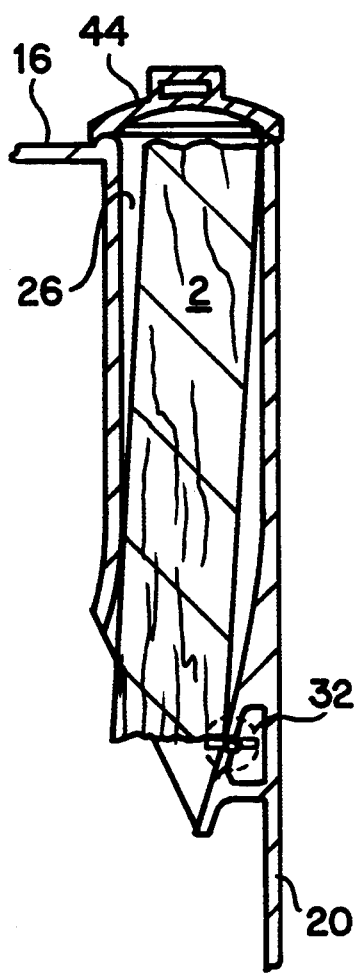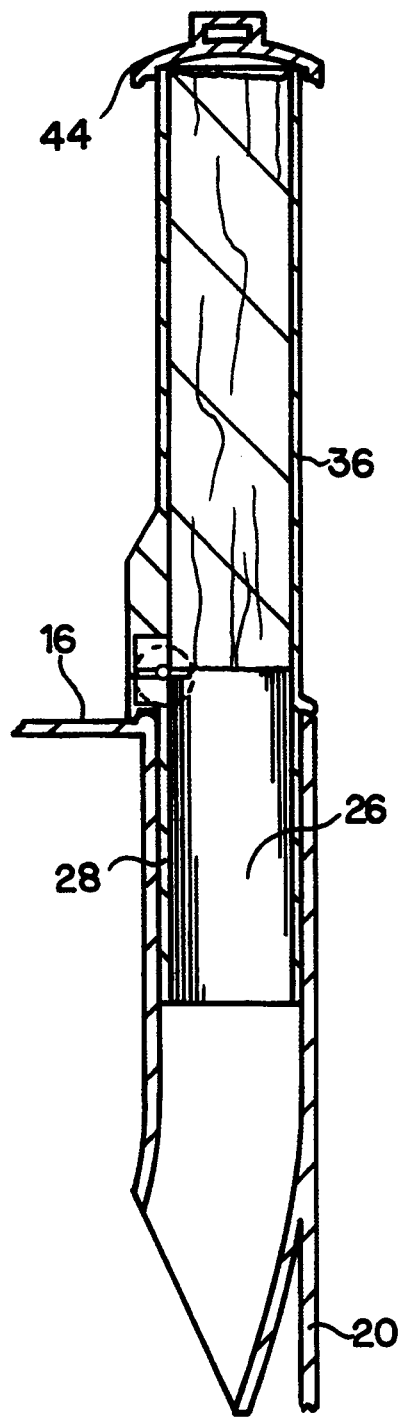
FIG. 14A
FIG. 14B

EQUINE FEED BIN

BACKGROUND OF THE INVENTION

1. Technical Field

The present invention relates to animal husbandry, and more specifically to a feeder for dispensing hay to a horse, other equidae or similar grazing animal.

2. Related Art

Feeding equids presents certain management problems. If the animal, using the horse as an example, is fed on the ground there is a possibility the horse will ingest dirt or foreign material along with its feed. There are a number of health risks and concomitant management problems that can occur when a horse is fed on the ground. These health risks and associated management problems from feed contamination on the ground include disease transmission, parasite infestation and the possibility of colic or other digestive difficulties. Colic represents a serious management problem and can be fatal to the horse. In addition to the health risks to the horse from eating off the ground, there are also economic and nutritional management concerns.

Economic waste occurs when feed isn't eaten by the horse because of unpalatability, or loss to the surrounding environment, for example due to wind or rain. Economic loss also occurs in the case of a horse having colic as a result of loss of the animal, veterinary costs incurred for treatment, as well as potential loss of the total value of the animal, if the case of a fatal episode of colic. Nutritional management problems arise because the leafy portion of the hay which possesses the majority of the nutritional value of the hay is the portion most likely to be lost or wasted as it falls underneath the stem-containing portion of the hay in on-the-ground feeding.

The related art has addressed these problems utilizing various feeder designs. Covered feed troughs have been designed for other species of livestock, particularly pigs. Two examples of such designs are found in Gross, U.S. Pat. No. 4,554,888 and von Taschitzki, U.S. Pat. No. 5,123,379. Because of the differences in anatomy and dramatic differences in ethological patterns of the equidae family compared to other domestic large animals, feeders designed for other species of livestock are normally not successfully substituted for use by horses. Existing covered feeders often have shields or lids over the opening which the animal puts its head through to obtain the feed. A horse will not willingly or comfortably push this type of moving barrier to obtain feed. Many covered swine feeders also produce a loud noise upon removal of the animal's head from the trough, which also makes these feeders impractical for use as a horse feeder. Other covered feeders for food animal livestock are designed for a plurality of animals to feed in close proximity to one another. Horses feed inefficiently in close proximity to each other because their quarrelsome interactions. Additionally a horse's neck is very different from a pig's in terms of actual shape and evolutionary intended use. Therefore a horse cannot and will not readily adapt itself to use of covered pig feeders.

Typical feeders designed for horses include an open grill portion that presents the hay and a hay-catching compartment to recover hay pulled loose by the horse or that falls from the horse's mouth. Two examples of typical horse feeders can be seen in FIGS. 4 and 5 of Cooke, U.S. Pat. No. 4,976,222.

The existing designs of horse feed troughs represent improvements in reduction of the amount of dirt and sand the horse is likely to ingest. Management problems still exist with these designs in the areas of economic and nutrient waste in the undertaking of feeding hay to a horse. Feed troughs utilizing a retaining grill for the hay allow the hay to be exposed to the weather and the hay can absorb moisture from damp air or rain, whereupon the hay can begin to mold or become unpalatable. In addition, most versions of horse feeders do not prevent or hinder the horse from pulling the hay out of the feeder, permitting both economic and nutrient loss represented by hay that is removed from the feeder. Open feeders with a retaining grill also allow the horse to be distracted by its surroundings while feeding. When more than one horse is being fed within an enclosure, the animals can become distracted by each other and lead to quarrelsome behavior between animals at feeding time. Antagonistic behavior between the animals is another management concern; the horses are at risk for physical or cosmetic injury from their interactions as well as decreased digestive efficiency. An additional problem with conventional horse feeders is a lack of means for regulating the amount of hay and time of feeding. The horse has immediate access to the entire quantity of hay placed in the feeder.

It is therefore an object of this invention to provide a horse feeder that reduces the economic and management losses associated with previous designs of horse feeders. It is an additional object of this invention to provide a covered feeder that is configured so a horse does not experience undue fear or stress from using the feeder. It is an additional object of this invention to provide a feeder that is covered and therefore decreases the loss of hay to the environment and reduces the likelihood of the horse pulling the hay from the feeder. A further object of this invention is to provide a feeder of unitary construction that decreases the risk of physical and cosmetic injury to the horse. A further object of this invention is to provide a means for feeding a horse a controlled amount of hay at a predetermined time, utilizing a uniquely designed feed delivery chute in combination with a timer means.

DISCLOSURE OF INVENTION

The present invention is a feeder for horses comprising an elongate feeder housing with a feeding chamber. The feeder has a rounded front side forming an elliptical arc in relation to the back side, with a feed access opening in the front side. The feed access opening is appropriate to accommodate the safe and natural entry of a horse's head into the feeding chamber. In the preferred embodiment of the invention the feeding chamber is deep enough to allow the entire head of the horse to be inside the feeder. Additionally, in the preferred embodiment of the invention the feed access opening has an "egg" shape opening. The lower edge of the feed access opening is positioned so that the bottom of the chamber serves as a feed holding bin. The top of the feeder has a feed delivery opening positioned close to the back side of the housing. The feed delivery opening is of rectangular shape appropriate for accepting a feed portion, commonly referred to as a flake, of a bale of hay, and the feed delivery opening extends into the feeder housing as a feed delivery chute, to a level that allows the flake of hay to land in the back of the feed chamber, with the upper portion of the flake still contained in the delivery chute. The feed delivery opening has a removable cover that can be placed over the opening to protect the inside of the feeder from exposure to the environment. In one embodiment of the invention the bottom of the feeder contains a removable plug for convenient cleaning of the feed chamber. In another embodiment of the invention the back of the feeder contains a 90° angle to allow for the fitted placement of the feeder in a corner. In either of the preferred embodiments a timer means for regulation of the delivery of the flake of hay is possible. An additional option for any of the embodiments is a separate and supplemental feed delivery chute that fits into the feed delivery opening of the feeder, thereby allowing for more than one flake of hay to be contained in the chute and allowing the hay flakes to pass into the feed holding bin of the feeder. The chute can incorporate the timer means as an alternative or adjunct to the timer being part of the feed delivery opening of the feeder.

BRIEF DESCRIPTION OF THE DRAWINGS

FIG. 14A is a cross-section view of a third embodiment of the present invention, showing another shape for the feed delivery chute and the use of a timer means for delivering the flake of hay to the feed holding bin.

FIG. 14B is a cross-section view of a third embodiment of the present invention, showing another shape for the feed delivery chute and the use of the supplemental feed delivery chute with the timer means for delivering the flake of hay to the feed holding bin contained in the supplemental feed delivery chute.

BEST MODE FOR CARRYING OUT INVENTION

Figure 1:
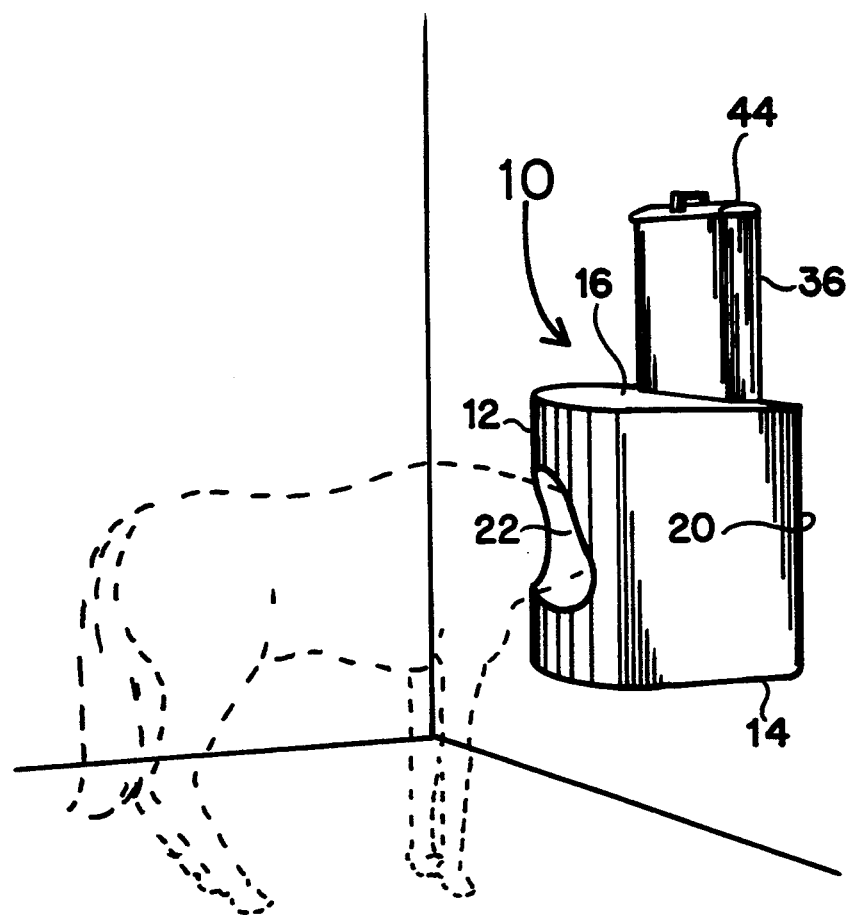
FIG. 1 is an isometric view of the preferred embodiment of the horse feeder of the present invention, showing the feeder mounted on a wall and a horse eating from the feeder.

Referring now to FIGS. 1-13 an equine feed bin, or feeder 10 is illustrated in accordance with the principles of the present invention. Feeder 10 generally consists of a top panel 16, a bottom panel 14, a front panel 12, and a back panel 20. An internal feed chamber 18 is defined by front panel 12, back panel 20, top panel 16, and bottom panel 14. Hay 2 is delivered into feeder 10 for feeding in a manner best seen in FIG. 7.

In the preferred embodiment of the invention feeder 10 is of unitary construction, fabricated out of a ultraviolet (UV) ray resistant molded plastic. The manufacture of the preferred embodiment includes any of the conventional plastic techniques, including blow-molding, roto-molding, injection molding and vacuum molding. Feeder 10 can also be fabricated out of other materials for example, stainless steel or bent wood.

Figure 3:
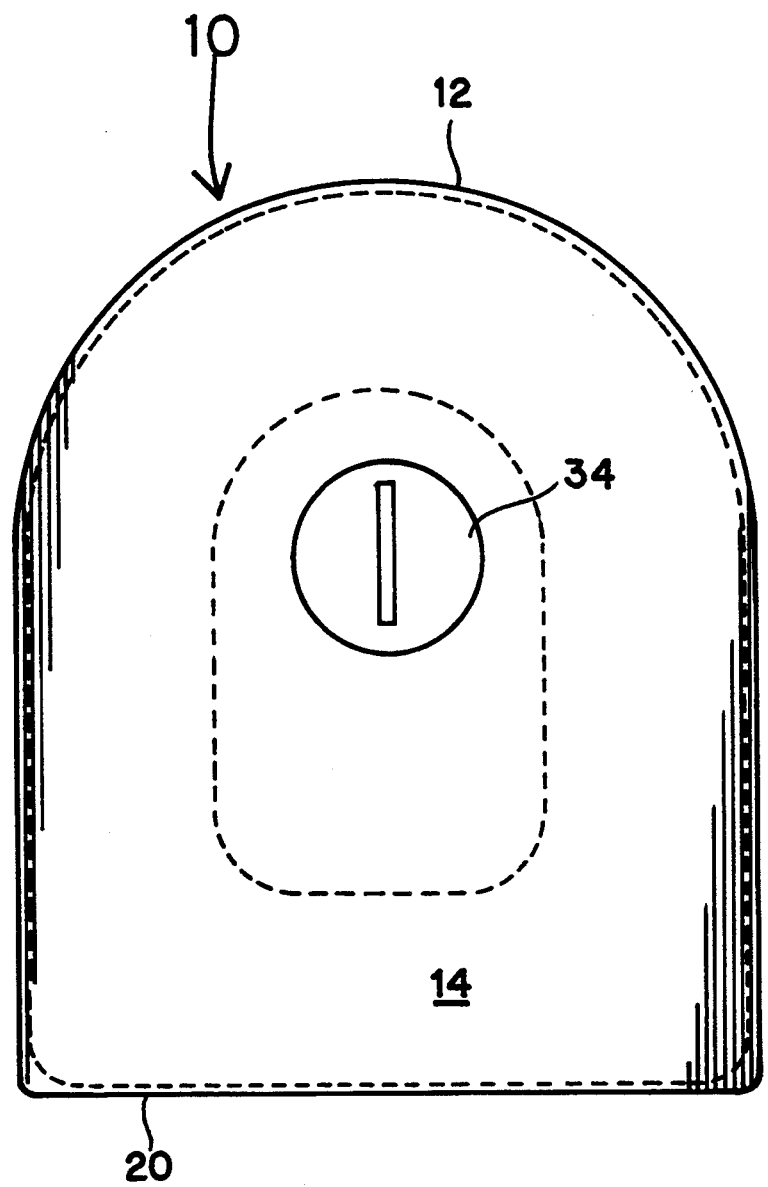
FIG. 3 is a bottom view of the preferred embodiment of the present invention.
Figure 7:
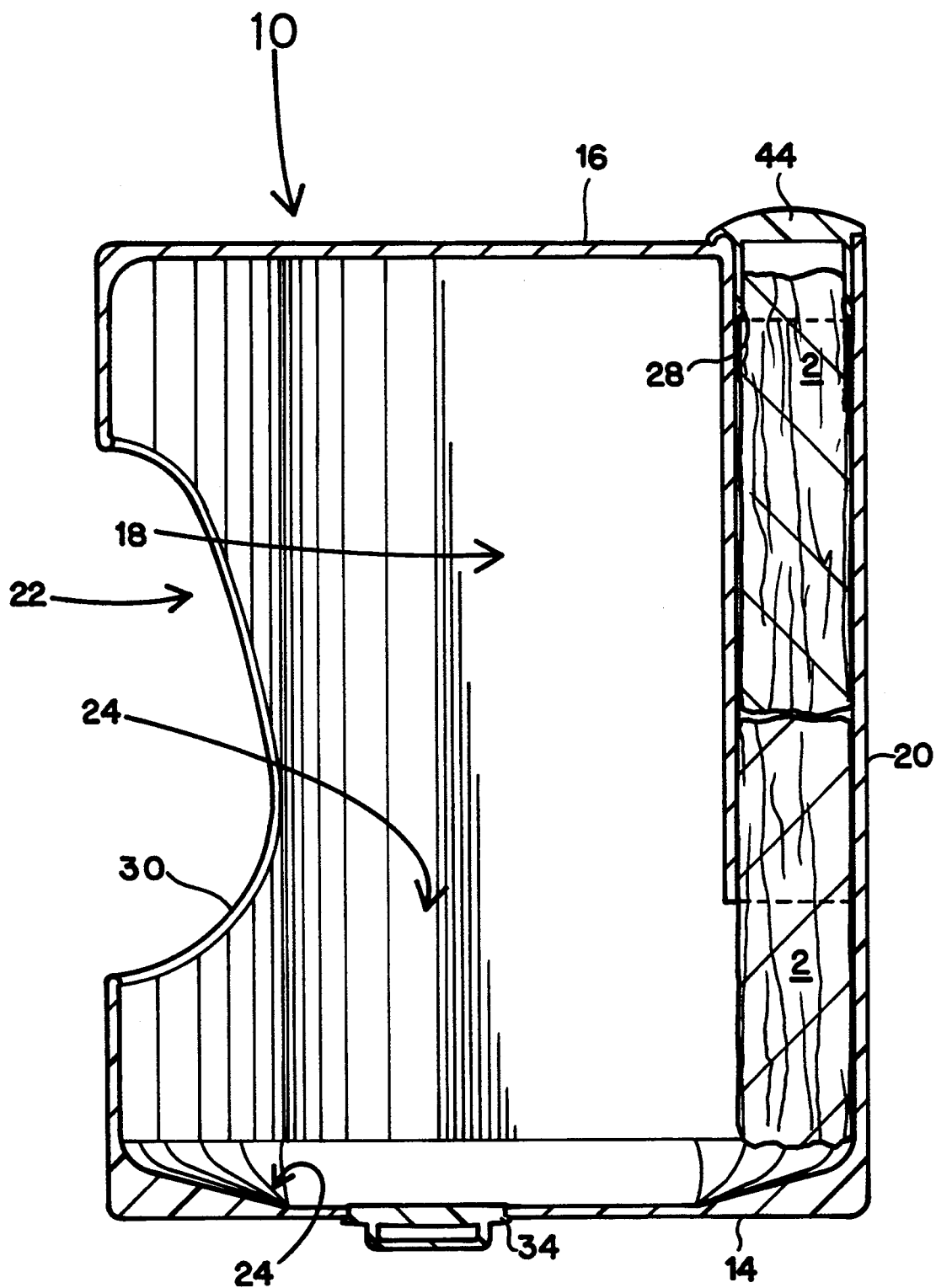
FIG. 7 is a cross-section view of the preferred embodiment of the present invention, showing the feed delivery chute extending into the feed housing and the position of the hay delivered into the feed housing.
Figure 8:
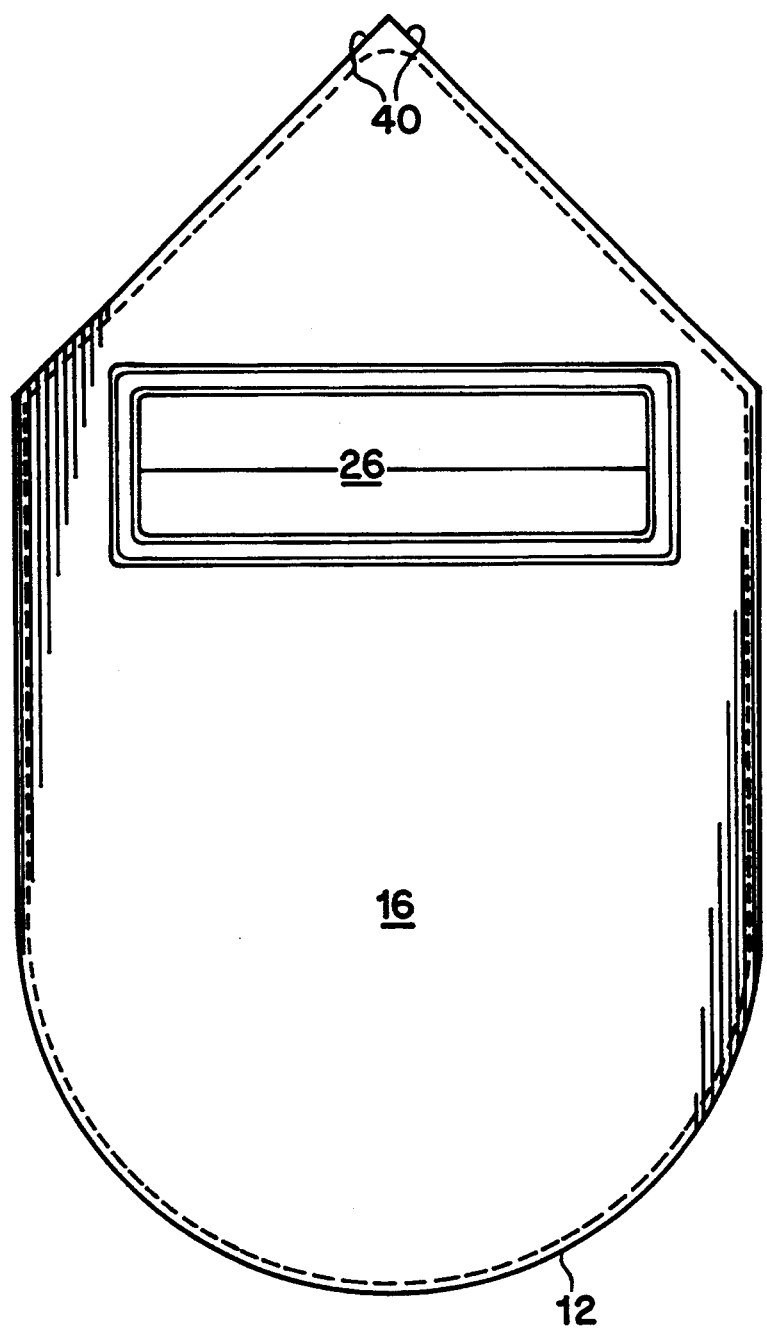
FIG. 8 is a top view of a second embodiment of the present invention.
Figure 9:
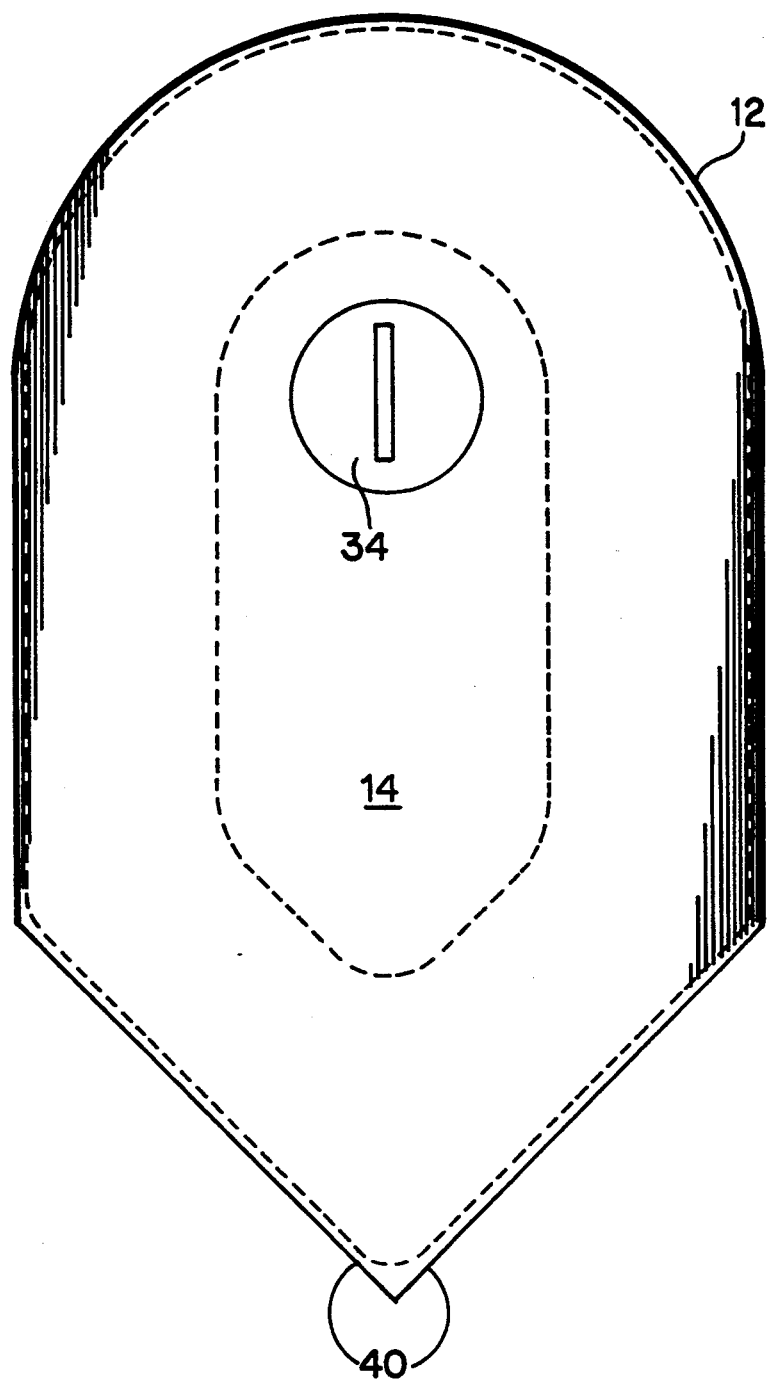
FIG. 9 is a bottom view of a second embodiment of the present invention.
Figure 10:
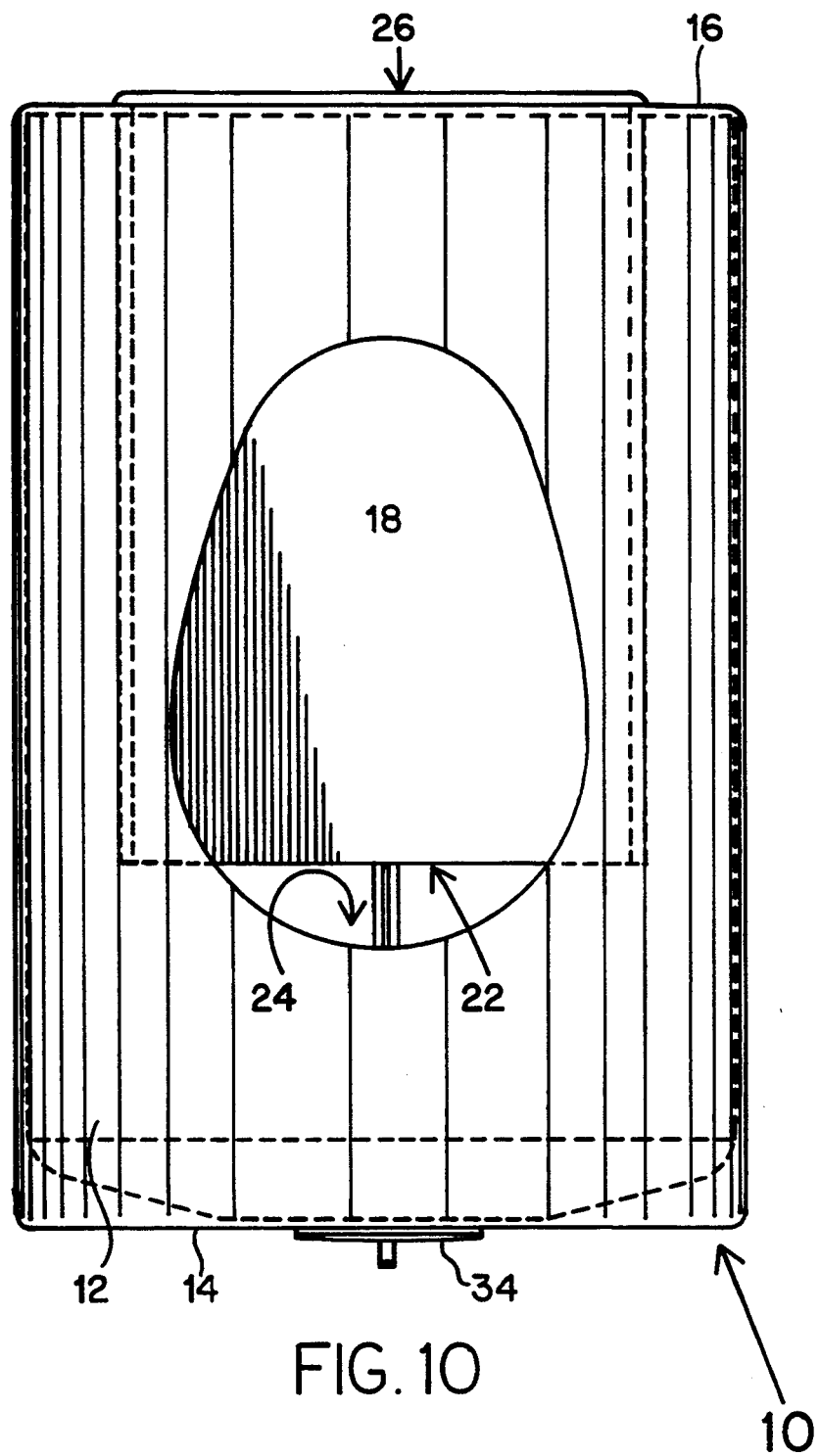
FIG. 10 is a front view of a second embodiment of the present invention.
Figure 11:
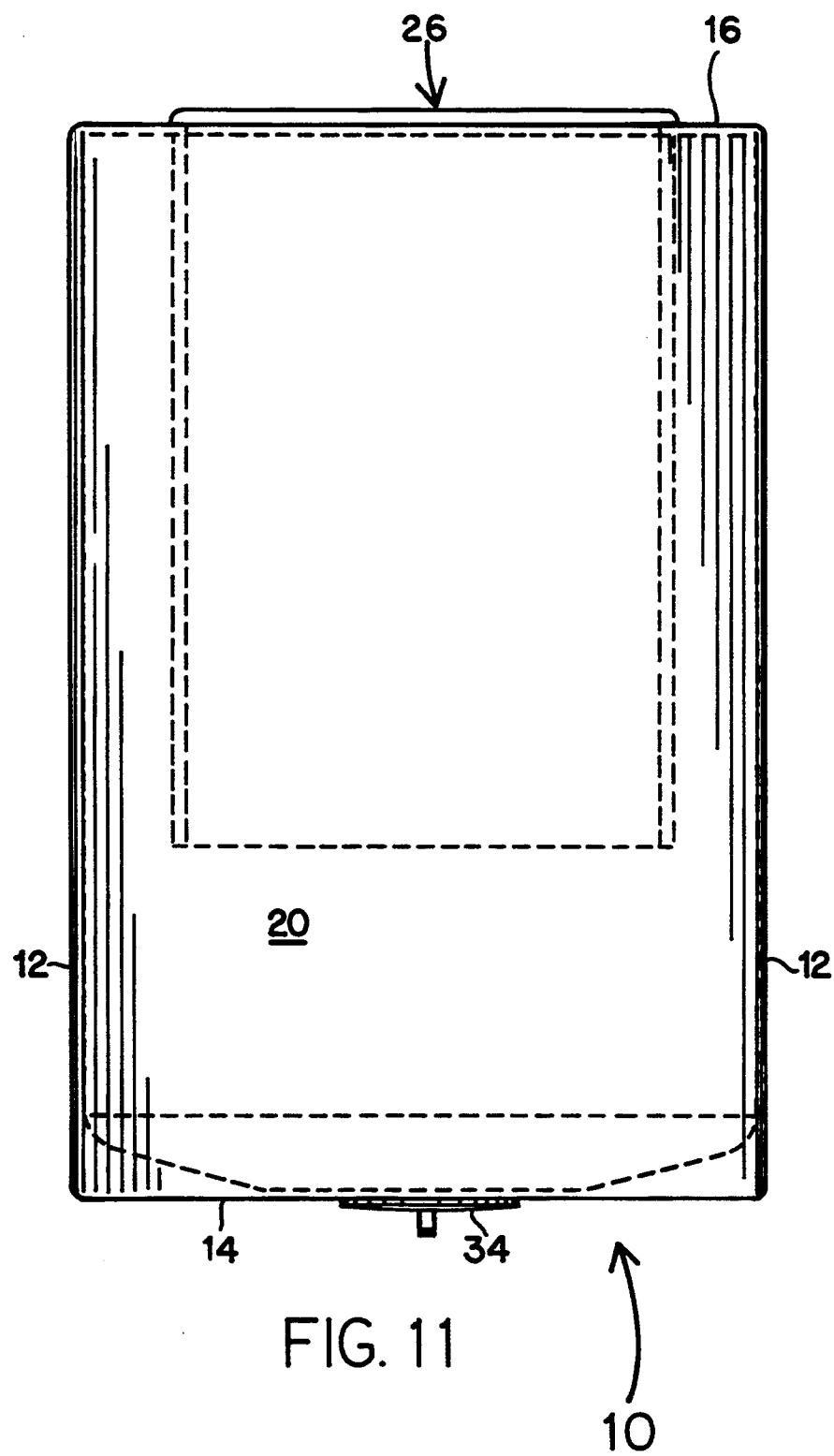
FIG. 11 is a rear view of a second embodiment of the present invention.
Figure 12:
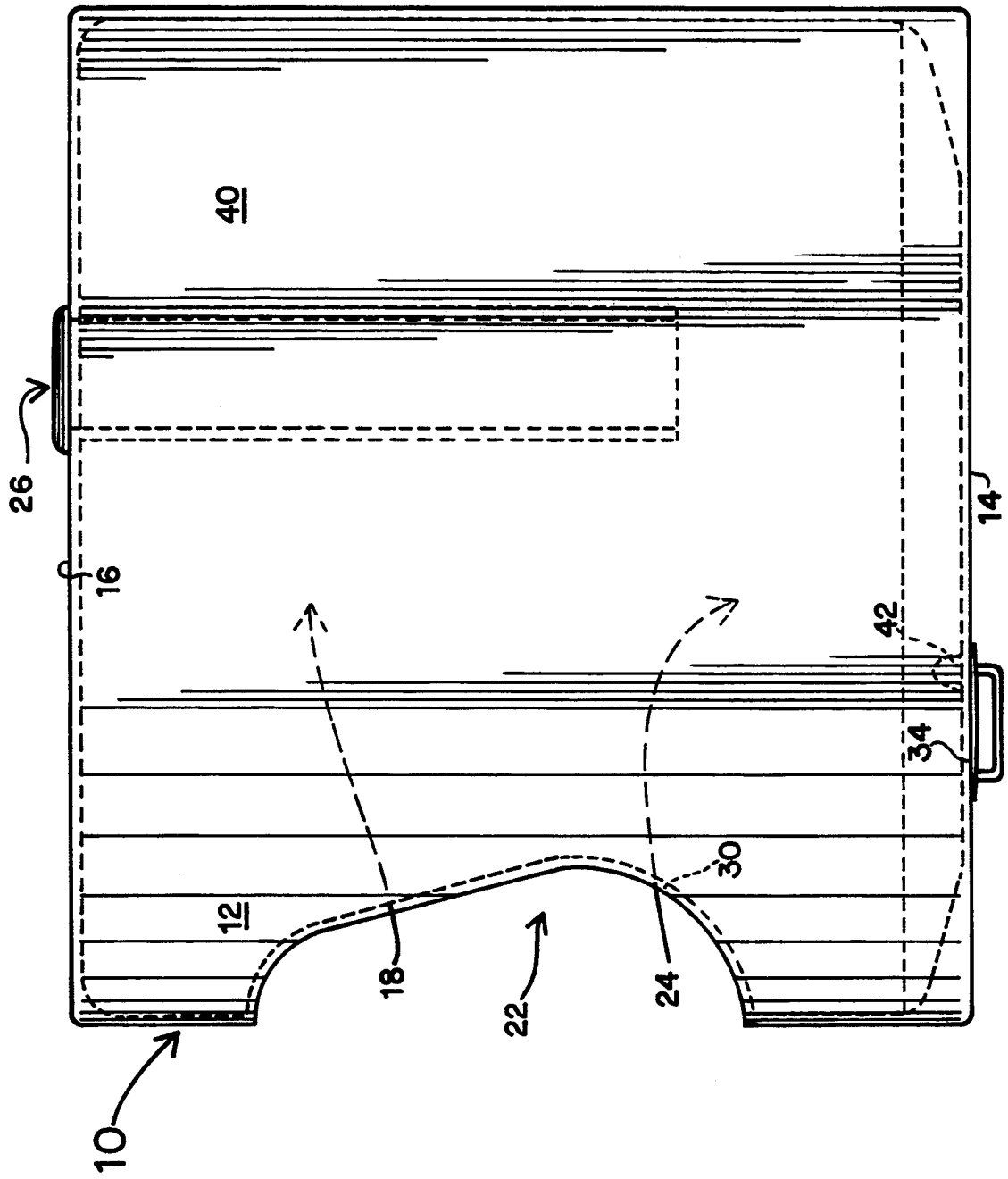
FIG. 12 is a side view of a second embodiment of the present invention.
Figure 13:
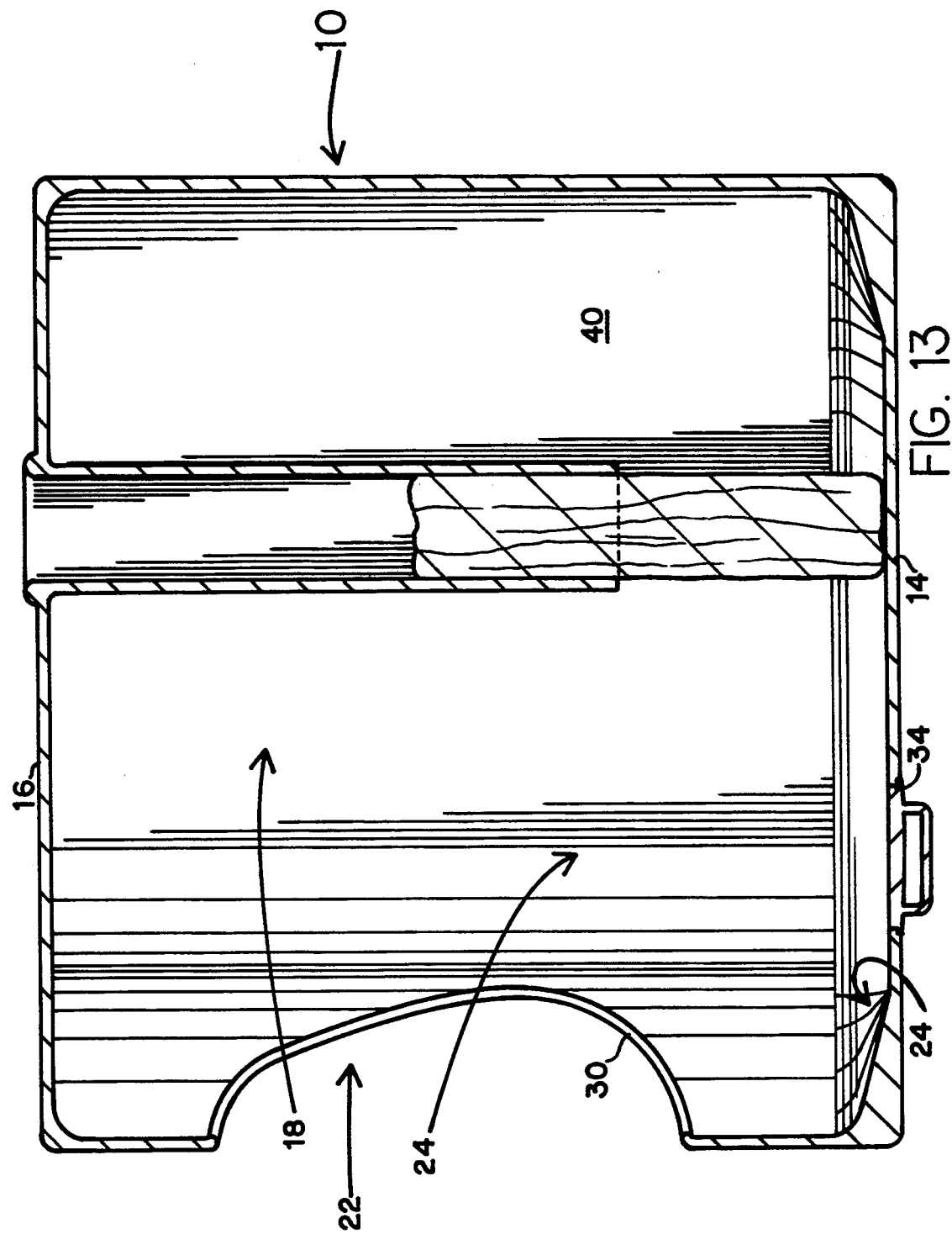
FIG. 13 is a cross-section view of a second embodiment of the present invention, showing the feed delivery chute extending into the feed housing and the position of the hay delivered into the feed housing.
Figure 15:
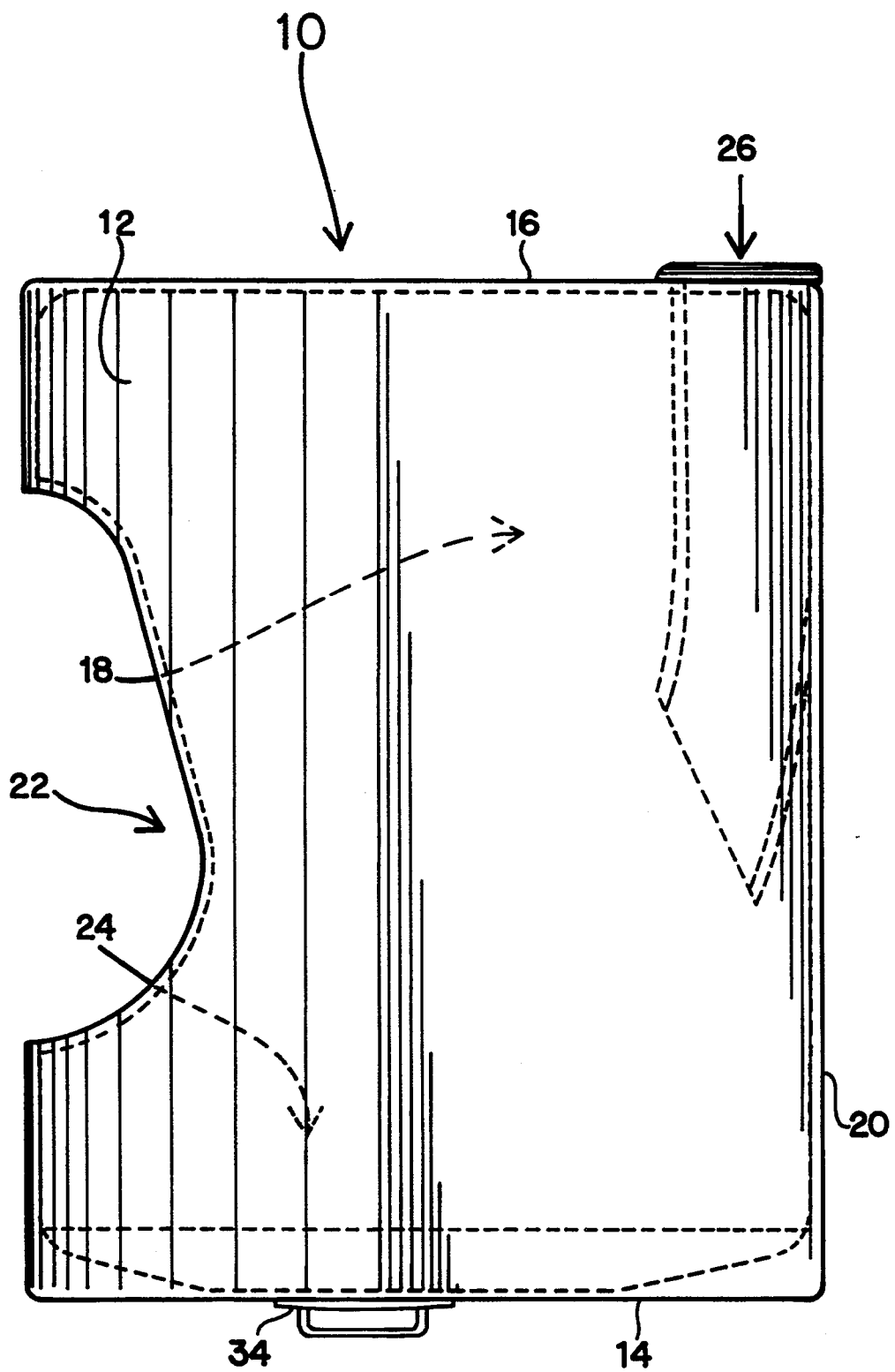
FIG. 15 is a side view of a third embodiment of the present invention.
Figure 16:
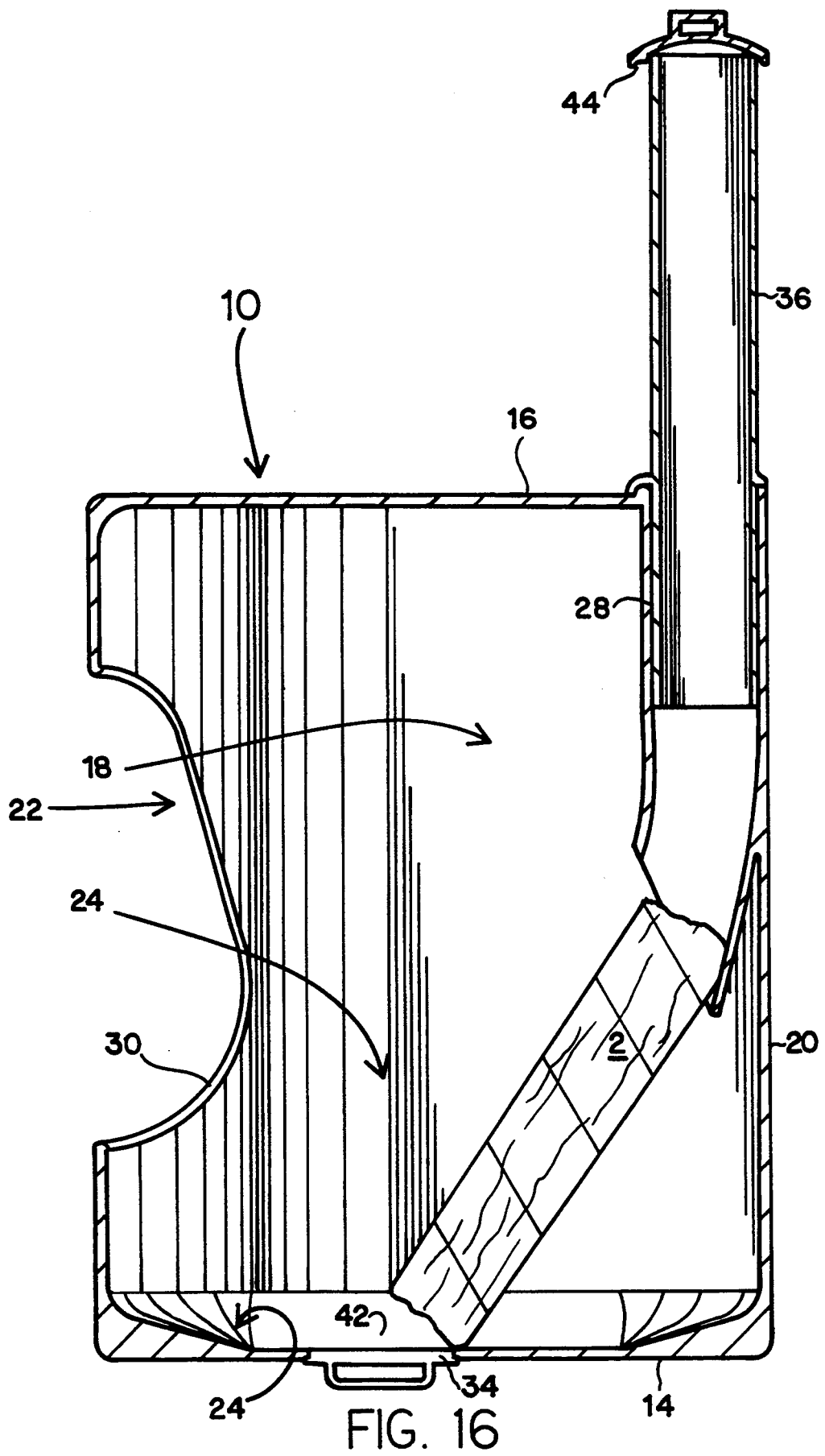
FIG. 16 is a side view of a third embodiment of the present invention showing the use of the supplementary feed delivery chute and the position of the hay delivered into the feed housing.

Bottom panel 14 is angled from the outside towards the center, as seen in FIG. 7, to facilitate the collection of matter in the center of bottom panel 14. Additionally, in the preferred embodiment bottom panel 14 contains a plug 34, as can be seen in FIG. 3 to serve as a clean-out port for feeder 10. Plug 34 can be removed from bottom panel 14 for easy cleaning of a feed holding bin 24 as part of routine maintenance and feed management practices. Plug 34 fits securely in bottom panel 14 and may utilize any standard fastening means. For example, plug 34 may thread into bottom panel 14, be molded to fit by being snapped in place or employ bayonet-style closing into bottom panel 14. It is possible for plug 34 to be removed for stacking or shipping of the feeders. Additionally, it is also possible for the outside walls of feeder 10 to extend below bottom 14 of feeder 10 so that plug 34 does not touch the ground if feeder 10 is set on the ground.

Figure 2:
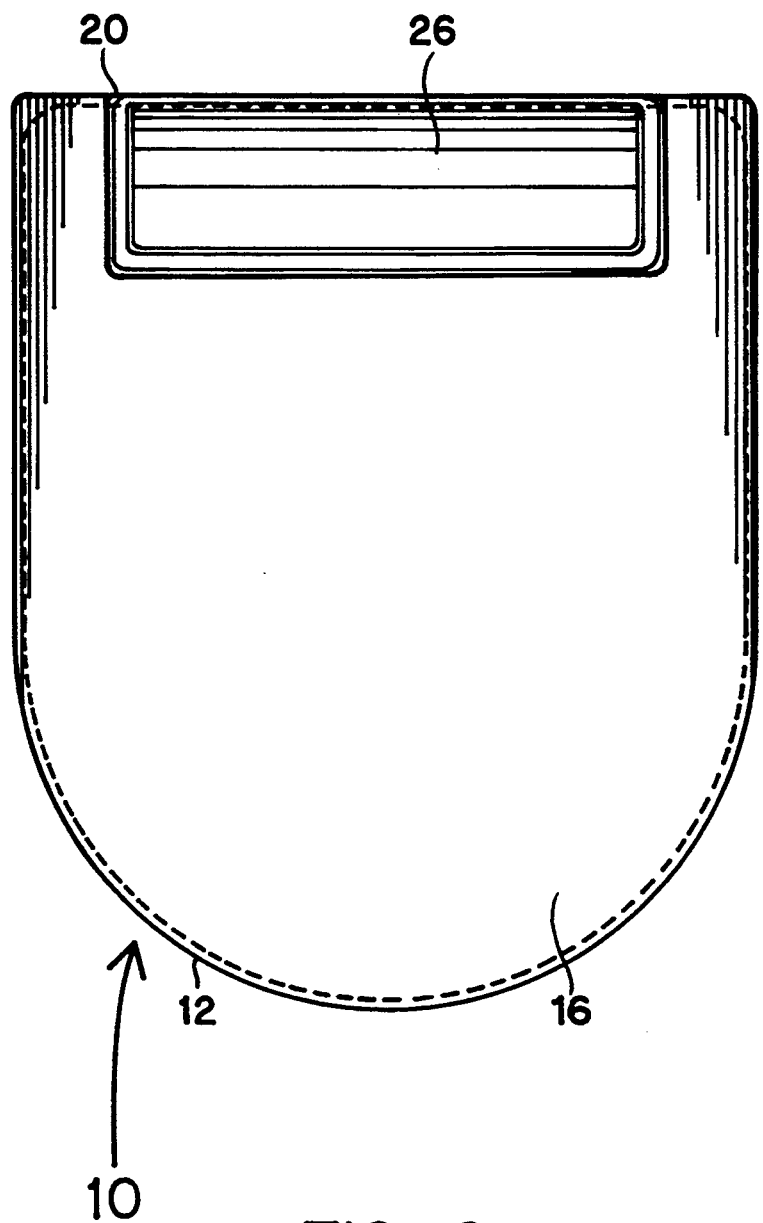
FIG. 2 is a top view of the preferred embodiment of the present invention.
Figure 4:
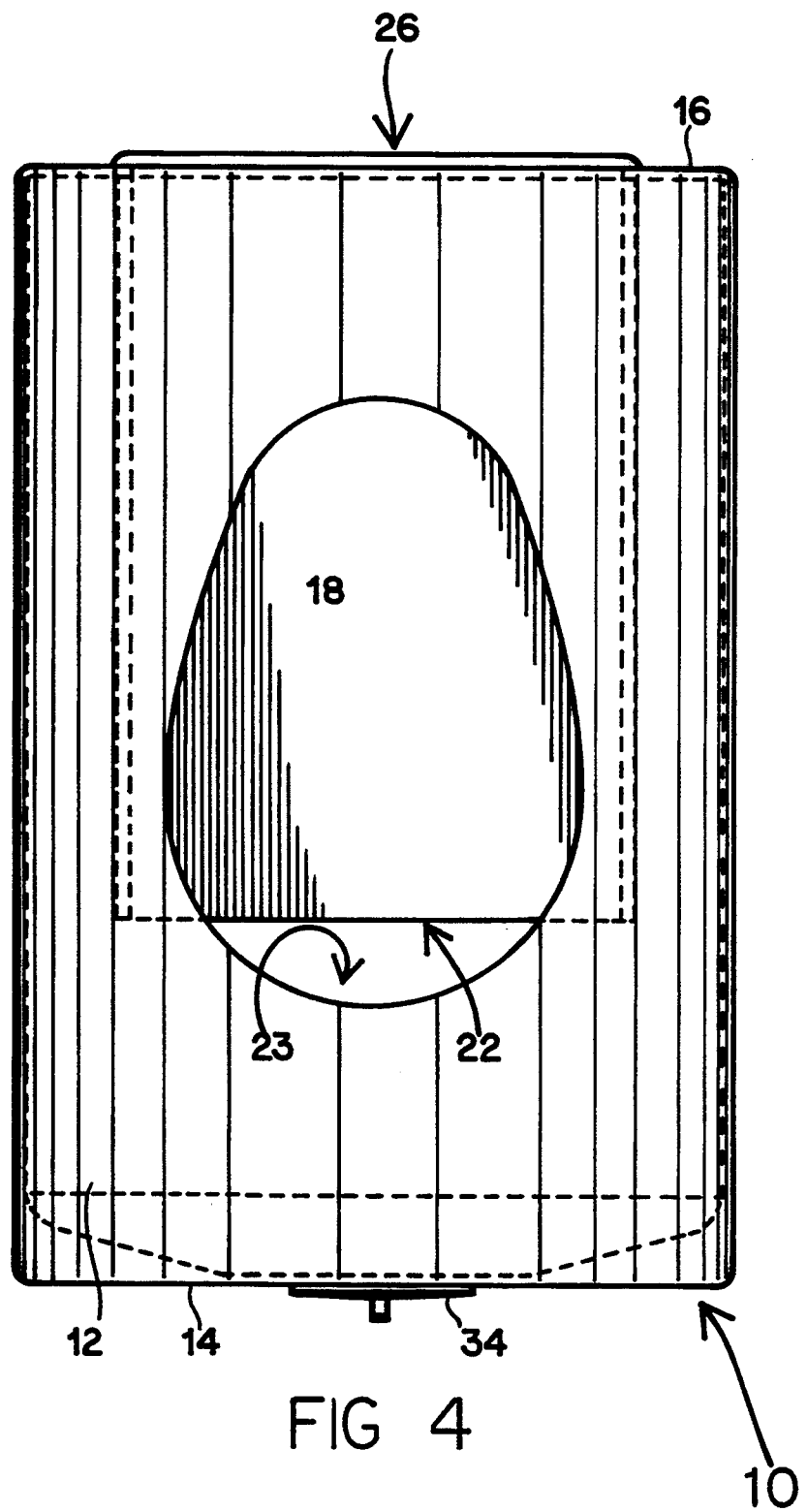
FIG. 4 is a front view of the preferred embodiment of the present invention.
Figure 5:
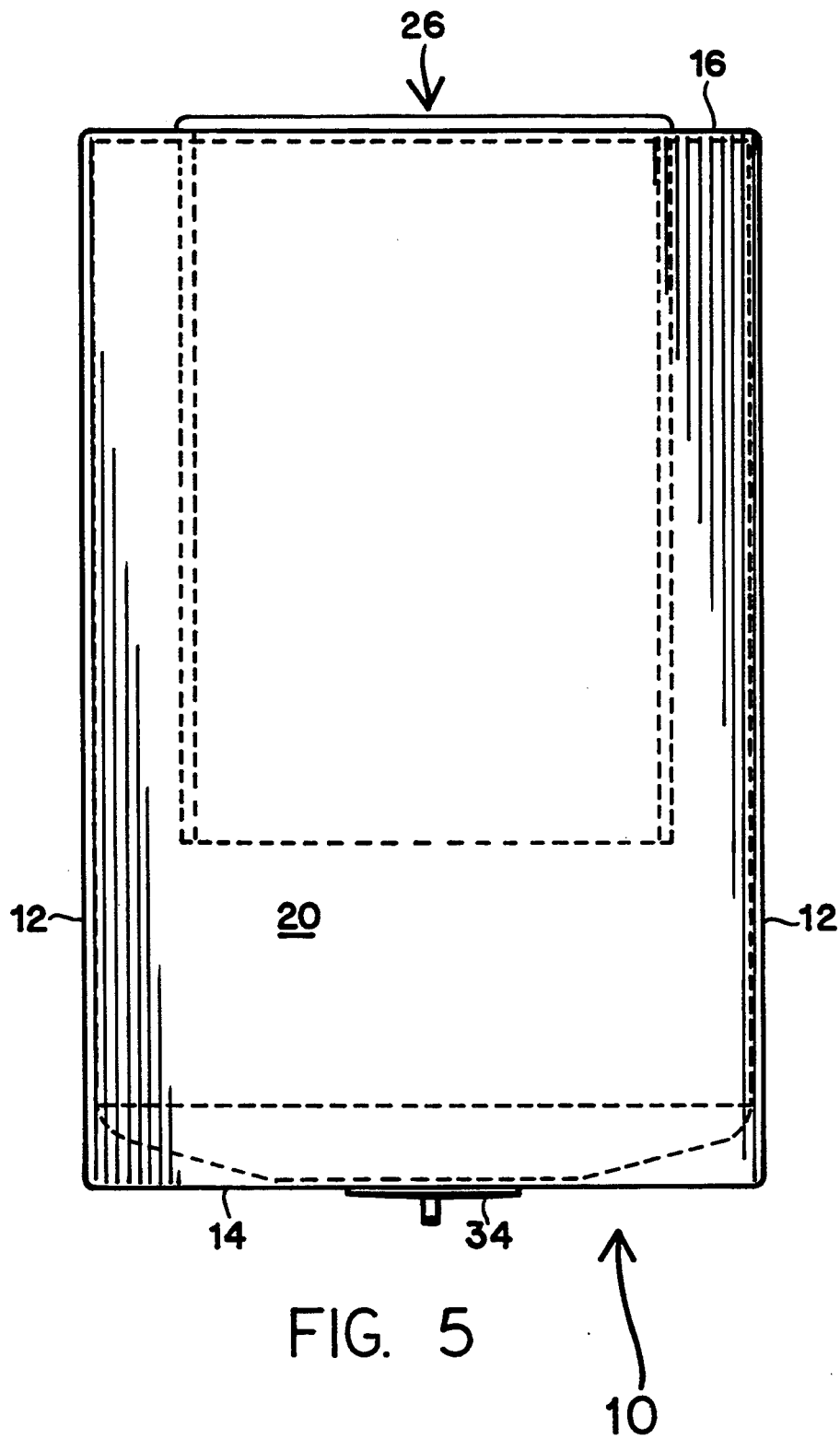
FIG. 5 is a rear view of the preferred embodiment of the present invention.
Figure 6:
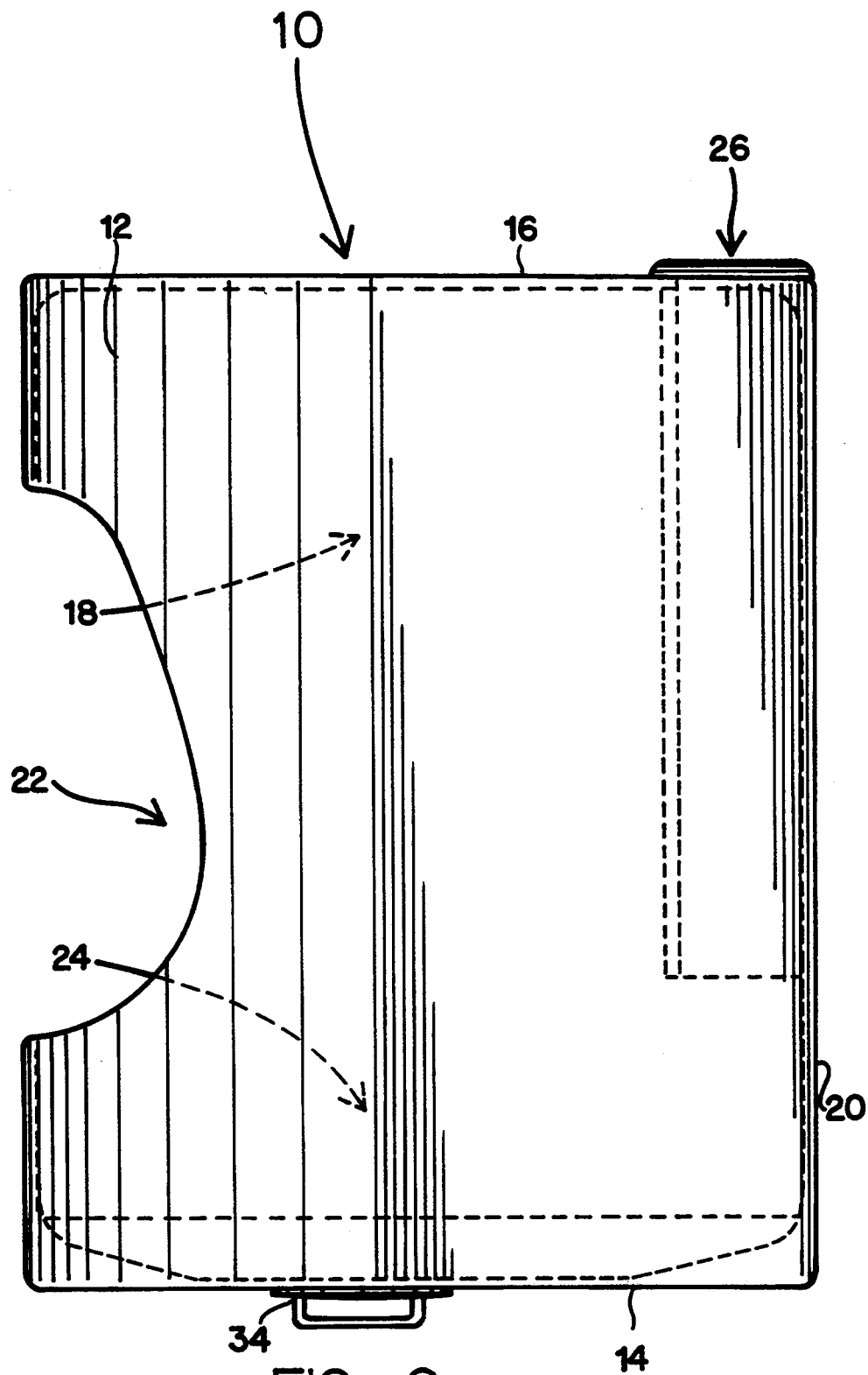
FIG. 6 is a side view of the preferred embodiment of the present invention.

Front panel 12 defines the front and sides of feeder 10 and is elliptical in shape in relation to back panel 20 and which is flat, as can be seen in FIGS. 2 and 3. Front panel 12 of feeder 10 has a feed access opening 22 which accommodates the entry of a horse's head into feed holding bin 24 as can be seen in FIGS. 4, 6 and 7. In the preferred embodiment feed access opening 22 is an egg shape as seen in FIG. 4 and possesses an atraumatic edge 30, as seen in FIG. 7. The atraumatic edge 30 is an edge which functions to prevent cosmetic or physical injury to the horse's head or neck region from the feed access opening 22. In the preferred embodiment of the present invention the atraumatic edge 30 is smooth and rounded and formed by rolling the edge after the molding of feeder 10. Additionally, the atraumatic edge may be formed using any standard technique for smoothing the edge of a surface, for example the edge may be rolled, or formed by sanding, buffing or using a router on the edge.

Feed access opening 22 has a lower edge above bottom panel 14 of feed chamber 18 so that bottom 14 of feed chamber 18 serves as a feed holding bin 24 as seen in FIGS. 4 and 7. The enclosed feed holding bin 24 functions to protect the hay 2 from the environment and also provides an enclosed feeding territory for the horse in which the horse can concentrate on its own feed and is unable to see other horses eating in the same enclosure. This enclosed feeding territory encourages reduced aggressive interaction between horses in the same enclosure and thereby increases feeding efficiency and represents improved management for the horses's safety and behavior.

Top panel 16 of feeder 10 possess a feed delivery opening 26 as can be seen in FIG. 2. Feed delivery opening 26 has a removable cover 44 that shields feed delivery opening 26, as seen in FIG. 7. From feed delivery opening 26 a feed delivery chute 28 extends into feed chamber 18, as can be seen in FIGS. 6 and 7. Chute 28 extends into feed chamber 18 to a level that allows flake of hay to land in the back of the feed chamber, with the upper portion of the flake still contained in the delivery chute. Back panel 20 is flat in relation to front panel 12 and can be seen in FIGS. 2 and 3. In a preferred embodiment of the present invention back panel 20 possesses a reinforced area molded into back panel 20 for mounting feeder 10. Alternative mounting methods and structures are appropriate for use with feeder 10 depending on the environment in which it is being mounted. For example, brackets may be attached to feeder 10 and the brackets may be mounted on a fence or corral panel. Alternatively, holes can be drilled in back panel 20 of feeder 10 and it may be attached directly to a stall wall or fence.

In another embodiment of the invention feed delivery chute 28 possess a mechanical timer means 32 as seen in FIG. 14A, for the controlled delivery of a feeding of hay 2 into feed holding bin 24. A variety of timer mechanisms can be used for timer means 32 including spring-operated, catch-operated and electronic timer mechanisms.

In one embodiment a supplemental feed delivery chute 36 can be used in conjunction with feeder 10. Supplemental chute 36 allows for a plurality of hay flakes 2 to be delivered into feeder 10. Supplemental chute 36 is designed to fit closely into the upper portion of feed delivery chute 28 as can be seen in FIGS. 1 and 14B. It is also possible for supplemental chute 36 to possess a timer means 33 for controlled delivery of hay 2 into bin 24 and can be seen in FIG. 14B. The timer means 33 can employ any conventional timer mechanisms, similar to those described for timer means 32.

Another embodiment of feeder 10 possesses a angled back panel 40 as can be seen in FIGS. 8–12. Back panel 40 contains a 90° angle to allow a snug fit of feeder 10 into the corner of the horses's stall or other enclosure possessing a corner.

In use feeder 10 is mounted above the ground at a level that allows the horse's head to enter feed access opening 22 at a level angle and drop down slightly to feed. Cover 44 is removed from feed delivery opening 26 and flake of hay 2 is placed in feed delivery opening 26 and passes through to feed holding bin 24. The horse then has access to the feed through feed access opening 22. To clean feeder 10, plug 34 can be removed from bottom panel 14 for easy extraction of debris from feed holding bin 24 as part of routine maintenance and feed management practices.

While there is shown and described the present preferred embodiment of the invention, it is to be distinctly understood that this invention is not limited thereto but may be variously embodied to practice within the scope of the following claims.

I claim:

1. A feeder for horses comprising: an elongate feeder housing with a central longitudinal axis having a wall enclosing a feeding chamber, said housing having a top and a bottom; said housing having a rounded front side forming an elliptical arc in relation to a flat back side opposite each other between the top and bottom; said housing having a feed access opening in the front side, said opening being a size appropriate to accommodate the safe and natural entry of a horse's head into the feeding chamber, said feed access opening having a lower edge above the feeding chamber bottom so that the bottom of the chamber serves as a feed holding bin, said top having a feed delivery opening being rectangular in shape appropriate for accepting a flake of hay and positioned close to the back side of the housing; a feed delivery chute extending into the feeder housing from said feed delivery opening to a level that allows a flake of hay to land in the feed chamber at an acute angle in relation to the bottom of the feed chamber.

2. The horse feeder of claim 1 being of unitary construction of molded plastic.

3. The horse feeder of claim 1 wherein the feed access opening possesses an atraumatic edge to reduce the possibility of injury to the horse.

4. The horse feeder of claim 2 wherein said feed access opening has an "egg" shape opening.

5. The horse feeder of claim 4 further comprising a timer means being disposed in the feed delivery opening for the timed and controlled delivery of a flake of hay.

6. The horse feeder of claim 4 further comprising a removable plug in the bottom of the feeder to allow cleaning out or removal of debris which may accumulate in the bottom of the feeding chamber.

7. The horse feeder of claim 5 further comprising a removable plug in the bottom of the feeder to allow cleaning out or removal of debris which may accumulate in the bottom of the feeding chamber.

8. The horse feeder of claim 4 further comprising a separate and supplemental feed delivery chute that fits into the feed delivery opening of the feeder allowing for a plurality of hay flakes to be contained in the supplemental feed delivery chute allowing said hay flakes to pass into the feed delivery opening of the feeder.

9. The horse feeder of claim 8 wherein the supplemental feed delivery chute possesses a timer means being disposed in the supplemental feed delivery opening for the timed and controlled delivery of a flake of hay.

10. A feeder for horses comprising: an elongate feeder housing with a central longitudinal axis having a wall enclosing a feeding chamber, said housing having a top and a bottom said housing having a rounded front side forming an elliptical arc in relation to a back side opposite each other between the top and bottom, the back side possessing a right angle allowing placement of the feeder into space defined by a corner, said housing having a feed access opening in the front side, said feed access opening having an "egg" shape opening and appropriate to accommodate the safe and natural entry of a horse's head into the feeding chamber, said feed access opening having a lower edge above the feeding chamber bottom so that the bottom of the chamber serves as a feed holding bin, said top having a feed delivery opening positioned close to the back side of the housing being of rectangular shape appropriate for accepting a feed portion, commonly referred to as a flake, of a bale of hay, said feed delivery opening extending into the feeder housing to a level that allows the flake of hay to land in the feed chamber at an acute angle in relation to the bottom of the feed chamber.

11. The horse feeder of claim 10 being of unitary construction of molded plastic.

12. The horse feeder of claim 10 wherein the feed access opening possesses an atraumatic edge to reduce the possibility of injury to the horse.

13. The horse feeder of claim 11 wherein said feed access opening has an "egg" shape opening.

14. The horse feeder of claim 13 further comprising a timer means being disposed in the feed delivery opening for the timed and controlled delivery of a flake of hay.

15. The horse feeder of claim 13 further comprising a removable plug in the bottom of the feeder to allow cleaning out or removal of debris which may accumulate in the bottom of the feeding chamber.

16. The horse feeder of claim 14 further comprising a removable plug in the bottom of the feeder to allow cleaning out or removal of debris which may accumulate in the bottom of the feeding chamber.

17. The horse feeder of claim 13 further comprising a separate and supplemental feed delivery chute that fits into the feed delivery opening of the feeder allowing for a plurality of hay flakes to be contained in the supplemental feed delivery chute allowing said hay flakes to pass into the feed delivery opening of the feeder.

18. The horse feeder of claim 17 wherein the supplemental feed delivery chute possesses a timer means being disposed in the supplemental feed delivery opening for the timed and controlled delivery of a flake of hay.

* * * * *